Figure 1:
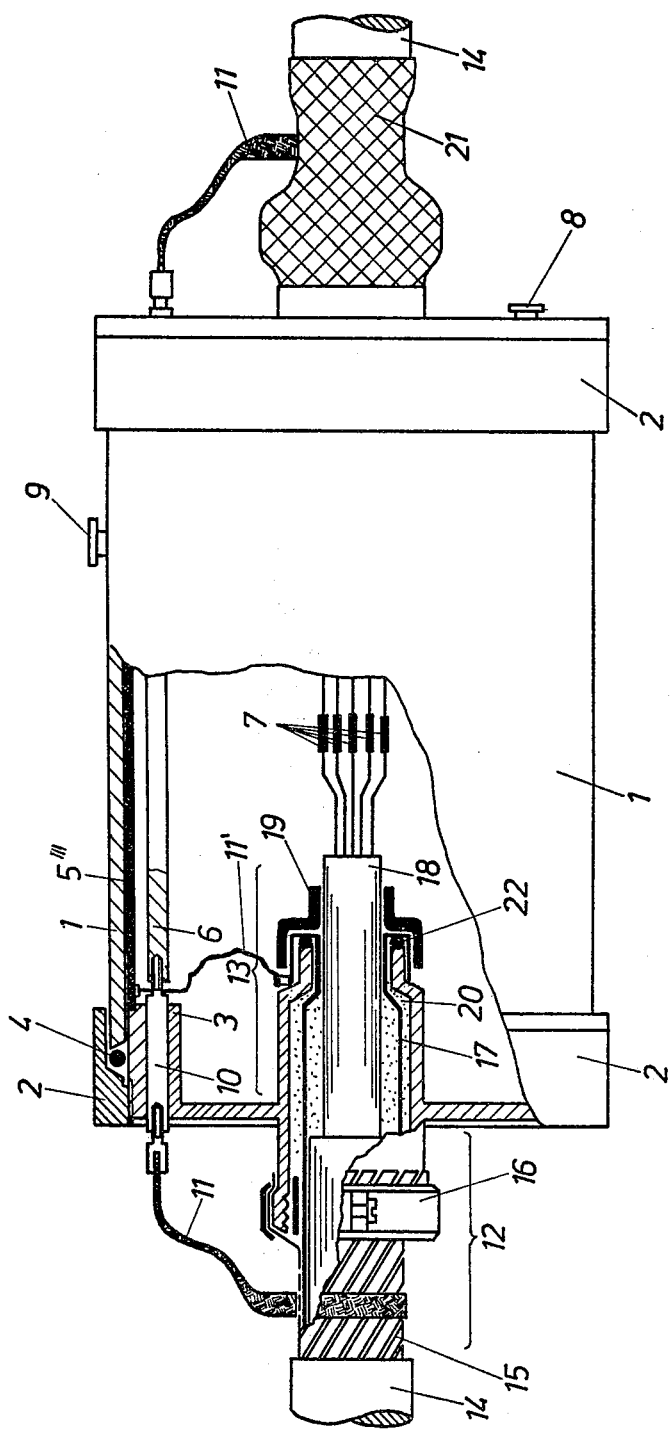

United States Patent [19]

Maričević et al.

[11] 4,381,425

[45] Apr. 26, 1983

[54] UNIVERSAL JOINT BOX FOR TELECOMMUNICATION OR POWER CABLES

[76] Inventors: Milenko Maričević, Odvojak N. Demonje 12/4, 41000 Zagreb; Janko Adamović, J. Andrića 2, 21203 Veternik; Zdravko Maričević, M. Tita 68, 75000 Tuzla, all of Yugoslavia

[21] Appl. No.: 231,430

[22] Filed: Feb. 3, 1981

[30] Foreign Application Priority Data

Feb. 6, 1980 [YU] Yugoslavia .................... 312/80

[51] Int. Cl.³ .................................. H02G 15/08
[52] U.S. Cl. .................................. 174/93; 174/75 C
[58] Field of Search .................. 174/88 R, 88 C, 91, 174/93, 75 C

[56] References Cited

U.S. PATENT DOCUMENTS

| | | | |
|---|---|---|---|
| 3,240,868 | 3/1966 | Ets-Hokin et al. | 174/93 |
| 3,692,926 | 9/1972 | Smith | 174/92 |
| 3,739,076 | 6/1973 | Schwartz | 174/75 C X |
| 3,808,353 | 4/1974 | Burtelson | 174/92 |

*Primary Examiner*—Roy N. Envall, Jr.
*Attorney, Agent, or Firm*—Fleit, Jacobson & Cohn

[57] ABSTRACT

A cable joint box having a tubular enclosure which is closed at each end by members which permit a cable to pass therethrough. The end members and tubular member employ sealing devices to seal one to the other and crossbars are provided between and connected to the end members.

10 Claims, 3 Drawing Figures

UNIVERSAL JOINT BOX FOR TELECOMMUNICATION OR POWER CABLES

The object of the invention is a universal joint box for telecommunication or power cables, which is intended for the termination of a cable and for mutual connection of two cables.

A joint box for cables has to accomplish two basic tasks, i.e. to make possible a mechanical connection and an electrical connection of cables. At each of these connections the joint box has to fulfil several tasks, e.g. at the mechanical connection there have to be achieved a mechanical protection of the connection point, protection against the breaking in of humidity onto the cable, relieving of the conductors of the axial pull, hermetical sealing of the space in which electrical connections between cable conductors are executed, electrical protection of the connection points of the cables and filling of the joint box with a sealing material, oil etc., depending on the type of the joint box. At the electrical connection the joint box has to ensure a proper mutual connection of the cable conductors and at the same time a sufficient mutual insulation at the connection points.

An important component of such a joint box is the lead-in terminal, which, on one hand, has to be universal at least within a certain range concerning all construction of cables as well as the diameter of the cable, i.e. a certain type of the lead-in terminal can be used for all cables, whose diameter is within a defined range, and on the other hand, it has to ensure a sufficient mechanical force onto the cable, whereby a uniform axial pull, bending and torsion of the cable are achieved.

Joint boxes as construction components have been known for a long time and have been manufactured in several different ways. There are known metal joint boxes, which are very heavy and not universal and cannot be used at novel types of cables either. Another type of a joint box is based on sealing resins, i.e. special resins, with which their interior is filled. The greatest disadvantage of such joint boxes lies in the fact that they cannot be reopened, besides, they be directly used for cables with PE cable sheathing. Recently, joint boxes have been made available, which are constructed on the basis of shrinkage tubes. These joint boxes are ruined at their reopening and, besides, they are rather expensive. Another group of joint boxes is characterized in that the sealing of the joint box is achieved by radial pressure of the sheathing of the cable against the lead-in terminal through which the cable is fed. The technology of these joint boxes is rather complicated and connected with rather high costs. All the stated types of joint boxes with the exception of the oldest, very heavy types cannot withstand high mechanical loads on the cables and cannot be exposed to high gas pressure.

In order to remove all these disadvantages of known embodiments of joint boxes, it was the intention of the inventors to construct a joint box which would be universal to the greatest possible extent, i.e. which would receive and connect cables of different types, constructions and diameters, which would be universal for telecommunication as well as for power cables, whose production would be simple and not expensive and whose assembling would be fast, with basic hand tools and without the need for a specially skilled worker. Besides, this joint box should be easily reopened and closed, it should ensure a high degree of mechanical safety and be able to withstand high gas pressure.

Figure 3:
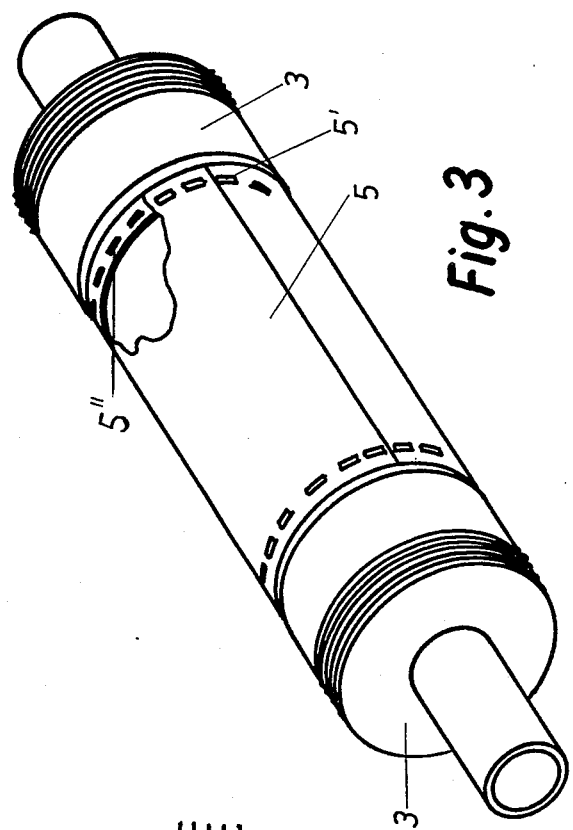
Figure 2:
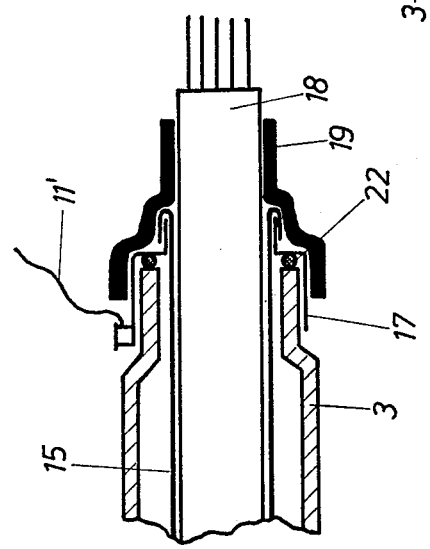

The universal joint box for telecommunication or power cables according to the invention is described in detail hereinafter and shown in the drawings, which represent:

FIG. 1 the joint box according to the invention in a partial cross-section,

FIG. 2 another embodiment of the inner part of the lead-in terminal in the cross-section of the joint box according to the invention, and FIG. 3 an axonometric view of a partially assembled joint box according to the invention.

As it can be seen from FIG. 1, at the outside of the joint box according to the invention there is a protection tube 1, which can be made of plastic material, rubber or metal, at each side there is a universal cable lead-in terminal 3 and two tightening nuts 2, whereby the tightening of the joint box according to the invention is achieved. As it can be seen in the drawing, the tube 1 is chamfered at both ends and the chamfering starts on the outer circumference of the tube 1 and reaches to the inner circumference of said tube 1. In the first embodiment the universal lead-in terminals 3, extending into the tube 1 from each side, are mutually connected with a crossbar 6. This connection is executed in such a manner that at least three metal inserts 10 reach from the front side of the terminals 3 through the terminal itself up to the interior of the joint box and are screwed into the crossbar 6. Said inserts 10 and the crossbar 6 form an electrically conductive connection between the front side of the terminals 3 so that over conductors 11 fixed to the inserts 10, an electrical connection can be formed between the armours 15 of the cables 14 entering the joint box.

The terminal 3 has an external thread onto which the tightening nut 2 is threaded with its internal thread. This nut 2 is formed in such a manner that a part of its jacket extends over the tube 1, whereas in the space between the nut 2 and the terminal 3 a ring gasket 4 is positioned.

In FIG. 3 there is axonometrically shown an embodiment of the joint box according to the invention where the crossbar 6 is substituted by a cylinder 5 made of electrically conductive material, preferably of sheet metal. Said cylinder 5 is composed of two halves, which have openings 5' on their circumference directed towards the terminal 3, through which openings there extend connecting teeth 5" positioned on the circumference of the terminal 3, which teeth catchingly engage into openings 5' on the cylinder 5. Thus, cylinder 5 is in electrical connection with the insert 10 by a part (not specially marked), which protrudes from the cylinder 5.

At the passage of the cable through the lead-in terminal 3, two requirements have to be fulfilled as it has already been stated in the introduction. On one hand, the cable 14 has to be mechanically unloaded, which is executed in the zone 12 of the cable, and on the other hand, the contact between the cable 14 and the terminal 3 has to be water- and gas-tight, which is executed in the tightening zone 13.

If the zone 12 as shown in FIG. 1 is considered, it can be seen that at the cable 14 at first the cable sheathing and then a part of the armour 15 of the cable 14 is removed. On its projecting tube-like part, the lead-in terminal 3 is cut in such a manner that this tube-like part forms a kind of spring ribs, which are surrounded by a compressible clamp 16. On the inside of the terminal 3, a connecting bridge 17 is positioned, which is either formed as shown in FIG. 1, whereas in FIG. 2 a second embodiment of this bridge 17 is shown. By a connector 11' said bridge 17 is connected either with the crossbar 6 or with the cylinder 5 and, because it is at the same time also in an electrically conductive contact with the armour 15 of the cable 14, the connection, which is otherwise made by the conductor 11, is substituted thereby.

It is characteristic for the tightening zone 13 that between the extreme inner end of the tube-like part of the terminal 3 and the bridge 17 a ring gasket 22 is positioned, at the same time over the bridge 17 and the sheathing 18 of the cable 14 there is placed a sleeve 19, which is impermeable for gas and water and which tightly abuts on the bridge 17 as well as on the sheathing 18. Said sleeve 19 can be made of one piece, but it can also be made by wrapping the cable with a convenient insulating material. Into the interior of the tube-like part of the terminal 3 between its inner wall and the sheathing 18 of the cable 14, sealing material 20 can be inserted.

The assembling of the joint box according to the invention is very simple. Onto both ends of cables 14 there are positioned tightening nuts 2 with the ring gaskets 4 and, in addition, onto one end of the cable there is put the protection tube 1. Depending on the length of the protection tube 1, defined by the art of the cables to be connected, the outer sheathing, the armours 15 and the water-impermeable sheathing 18 are removed from both ends of the cables. Both ends of the cables 14 are inserted into the terminal 3 and are fixed with the clamp 16 and then they are sealed with the sleeve 19 and/or sealing material 20. The mutual mechanical connection of both terminals 3 is executed by the insertion of the crossbars 6, into which the inserts 10 are screwed, whereafter there are executed the final electrical connection points 7 of the cable conductors, which are mutually insulated. In the second embodiment one half of the cylinder 5 with the openings 5' is put onto the connecting teeth 5" of the terminals 3, whereafter the connection points 7 and the final contact between the insert 10 and cylinder 5 or the connection between the bridge 17 and the crossbar 6 or the cylinder 5 is made by means of the conductor 11' and the second half of the cylinder 5 is fixed to both terminals 3. Thereby a firm mechanical connection between both terminals 3 is achieved, whereafter the protection tube 1, the ring gaskets 4 and the tightening nuts 2 are pulled over the cylinder and the tightening nuts 2 are tightened, so that by the compression of the ring gasket 4 and its abutting on the front wall of the protecting tube 1, the outer circumference of the terminal 3 and the inner circumference of the tightening nut 2, a complete sealing of the interior of the joint box is achieved. If the electrical connection of both armours 15 of the cable 14 has not been made in the interior of the joint box according to the invention as it has been described above, this connection can be made by conductors 11, which on one side are connected to the armours 15 of the cable 14 and on the other side to the insert 10 in the terminal 3.

In case that the crossbar 6 is used for the connection of the terminals 3 and that at the same time it is necessary that the interior of the joint box is electrically screened, it is possible to surround the joint box, before the protection tube 1 is assembled, with a metal shield 5''', which is electrically connected to the crossbar 6 in a convenient way.

The protection tube 1 can be provided with an opening 9, through which the interior of the joint box according to the invention can be filled with sealing material or oil, and a valve 8 for the introduction of compressed air or nitrogen into the interior of the joint box can be positioned on the terminal 3. It is evident from the foregoing that the joint box according to the invention is a constructional component, whose manufacturing is simple and which in a novel manner makes possible a simple and reliable connection of cables electrically as well as mechanically, and at the same time a repeated opening of the joint box is possible without difficulties if any new work has to be done at the connection points of the cables in the joint box.

What is claimed is:

1. A cable joint box for enclosing the connection of the ends of a pair of cables, said cable joint box comprising:
   a. a tubular enclosure open at each end;
   b. a pair of end members adapted to close the respective ends of said tubular enclosure, said end members including an opening to permit a cable to pass therethrough;
   c. means to interconnect said end members to position the same at a predetermined spacing;
   d. tightening means carried by said end members and engageable therewith for axial movement relative thereto, said tightening means engageable with said tubular enclosure;
   e. annular sealing means positioned between said tightening means and an end of said tubular member, whereby said sealing means is compressed to provide a fluid-tight seal between said tubular member, said tightening means, and said end member when said tightening means is moved axially toward the end of said tubular enclosure; and
   f. each of said end members including means to secure the respective cables thereto.

2. The cable joint box of claim 1 wherein said means to interconnect said end members include a plurality of crossbars extending between and connected to said end members.

3. The cable joint box of claim 1 wherein said means to interconnect said end members includes an inner hollow cylinder extending within said tubular enclosure and between and connected to said end members.

4. The cable joint box of claim 3 wherein said inner cylinder is defined by two half cylinders.

5. The cable joint box of claim 4 wherein one of said end members and said cylinder includes radially extending teeth and the other of said end members and said cylinder includes radial openings, said teeth engageable with said openings, whereby loads imposed on said end members are transmitted to and carried by said cylinder.

6. The cable joint box of claim 1 wherein said means to interconnect said end members are electrically conductive.

7. The cable joint box of claim 6 wherein the cables include an inner conductor and a coaxial outer conductor and said cable joint box includes conductive means to interconnect said outer conductors and said end member interconnection means.

8. The cable joint box of claim 1 including a connecting bridge within said box and adapted to overly the end of a cable, and a sleeve sealingly engageable with said bridge.

9. The cable joint box of claim 1 wherein said end enclosure members include sealing means at the openings through which the cables are adapted to pass in order to provide a fluid-tight seal therebetween.

10. The cable joint box of claim 1 wherein said cable securing means includes an outwardly extending tubular portion adapted to surround and engage said cable, and clamping means to clamp said tubular portion to said cable.

* * * * *